Aug. 14, 1945. H. L. AMRHEIN ET AL 2,381,869
COP TUBE OR HOLLOW CORE FOR PACKAGES OF YARN AND THE LIKE
Filed June 22, 1944
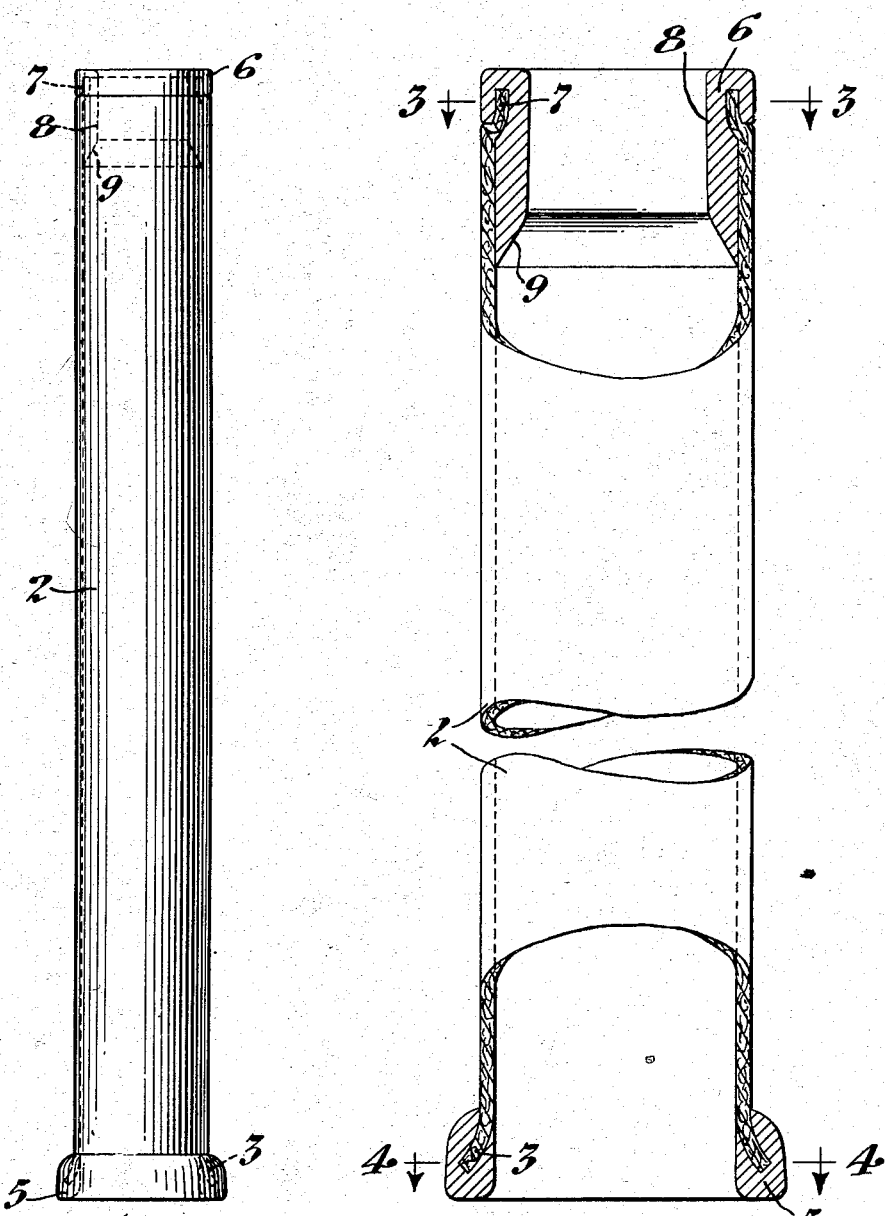
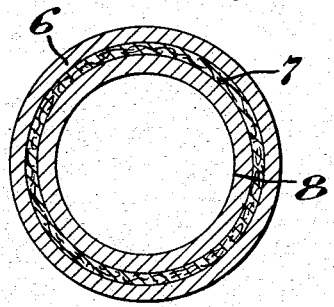
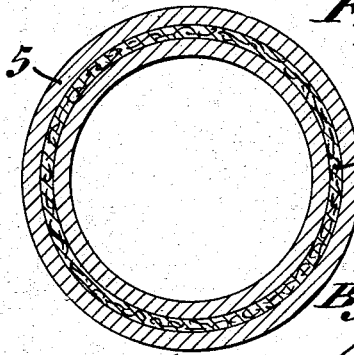
Fig. 1.   Fig. 2.   Fig. 3.   Fig. 4.
Inventors:
Harald L. Amrhein
and Emil E. Fuller
By
Attorneys.

Patented Aug. 14, 1945

2,381,869

UNITED STATES PATENT OFFICE 2,381,869

COP TUBE OR HOLLOW CORE FOR PACKAGES OF YARN AND THE LIKE

Harald L. Amrhein and Emil E. Fuller, Woonsocket, R. I., assignors to American Paper Tube Company, Woonsocket, R. I., a corporation of Rhode Island Application June 22, 1944, Serial No. 541,508

5 Claims. (Cl. 242—119)

This application is a continuation-in-part of United States application Serial No. 500,224, entitled Textile bobbin and method for producing same, filed August 27, 1943.

The present invention relates to improvements in cop-tubes or hollow cores for supporting yarn and thread in bobbins, pirns or the like used generally in textile machines and to a method of producing the same.

One object of the invention is to provide a light-weight cop-tube or yarn-support of simple construction having a smooth exterior surface, not subject to splitting, splintering, or becoming dented or roughened and more durable in use than wooden or other tubes previously used for similar purposes.

Another object is to provide a yarn-support of the type indicated comprising a paper or fiber tubular barrel and a molded plastic thimble or bushing rigidly secured thereto at one end and a plastic head or ferrule molded around its opposite end.

Another object is to provide a cop-tube of the type indicated in which the plastic thimble and ferrule are accurately positioned concentrically of the barrel to prevent the tube from running out when mounted on the spindle of the machine in which it is used.

Another object is to provide a cop-tube of the type indicated in which the ends of the barrel are embedded in and completely surrounded by the plastic material forming the thimble and ferrule to secure the parts against relative rotary and longitudinal movement.

Another object is to provide a method of molding the plastic thimble and ferrule around the terminal portions of the barrel of the cop-tube to secure a rigid, permanent joinder therewith.

Another object is to provide a method of molding the plastic thimble and ferrule around the barrel of the cop-tube which is simple to perform and adapted to produce a more durable article at greatly reduced manufacturing cost.

Further objects of the invention are set forth in the following specification which describes a preferred form of construction of the improved cop-tube and a method of producing the same, by way of example, as illustrated by the accompanying drawing. In the drawing:

Fig. 1 is a longitudinal view of a cop-tube or yarn-support incorporating the novel features of the present invention;

Fig. 2 is an enlarged view of the same showing the opposite ends of the cop-tube in section to illustrate the manner of molding the thimble or bushing and the head or ferrule around the ends of its barrel;

Fig. 3 is a transverse sectional view on line 3—3 of Fig. 2 showing the manner in which the plastic thimble or bushing is molded around the contracted end of the barrel; and Fig. 4 is a transverse sectional view on line 4—4 of Fig. 2 illustrating the manner in which the plastic head or ferrule is molded around the expanded flange at the opposite end of the barrel.

The present invention relates generally to cop-tubes or hollow cores adapted for various uses such as supporting the yarn in spinning bobbins and like textile cops and packages. The present improved cop-tube comprises a barrel constituted by a tube of fibrous material, for example, paper or compressed pulp, and having a bearing bushing or thimble within its interior at one end and a head or ferrule surrounding its opposite end, each formed of suitable molded plastic. In accordance with the present invention the plastic elements are molded in place around the ends of the tube or barrel to completely surround the fibrous material thereof and fixedly secure them in place without the use of fastening devices liable to become loosened or broken. Preferably, the end of the tube or barrel is contracted circumferentially at one end and the plastic thimble molded around the interior and exterior of this portion of the barrel with the contracted portion thereof completely enclosed by and embedded in the material of the thimble. The opposite end of the tube or barrel may have an expanded flange with the plastic head or ferrule molded therearound to completely enclose the expanded portion of the tube and embed it therein.

Referring to the drawing, one form of construction of the present improved cop-tube or yarn-support is illustrated herein as of a type generally used as a core for supporting spinning bobbins. The lower end of the tubular barrel 2 is usually provided with an annular head or ferrule 5 having an internal diameter substantially equal to the interior diameter of the tube and projecting radially outward beyond its periphery in the form of an enlargement thereon. The opposite end of the tube 2 is provided with a thimble 6 in the nature of a bushing having a bore of less diameter than that of the interior of the tube and molded around the end of the latter with its outer circumference flush with the outer periphery of the barrel.

In the present drawing the tube or barrel 2 is represented as composed of fibrous material such as paper or compressed pulp. Preferably, it consists of layers of paper or similar sheet material wrapped or wound about a cylindrical mandrel of suitable diameter with the superimposed layers cemented together by an adhesive. Referring to Fig. 2, the lower or butt end of the tubular barrel 2 may be formed with an integral flange 3, produced by expanding the fiber or paper material during construction of the tube or after its completion. The flange 3 may be of cylindrical or conical form and is preferably curved or belled outwardly as shown in the drawing. The ferrule or head 5 may take any suitable shape, being herein shown in the form of an annulus composed of suitable thermosetting plastic material molded to the desired dimensions. The head or ferrule 5 is molded around the end of the barrel 2 and caused to flow into its interior to provide a lining therefor flush with its inner wall.

At the opposite end of the barrel 2 the bushing or thimble 6 is likewise of annular form fitting closely against the inner wall of the barrel and flush with its outer periphery. The bushing or thimble 6 is provided with an axial bore 8 somewhat less in diameter than that of the interior of the barrel 2. The terminal portion of the barrel 2 is preferably contracted or otherwise shaped to provide a cylindrical flange 7 of reduced diameter. The plastic material of the thimble 6 is molded around the flange 7 to surround its sides and end, thereby completely embedding the flange in the material. The outer peripheral surface of the thimble 6 is formed flush with the outer periphery of the barrel 2, thus providing a smooth surface so that when the yarn is unwound from this end of the cop-tube it can be drawn off without obstruction. In some cases the bore 8 of the thimble 6 may be tapered slightly and its inner end is preferably provided with a reentrant or beveled opening 9 to facilitate placing the tube on the spindle with which it is used. It will be understood that in spinning and like machines the spindle on which the cop-tube is mounted is usually of reduced diameter at its upper end and the thimble or bushing 6 is adapted to fit snugly over this end of the spindle to provide a proper bearing thereon.

The present improved cop-tube or yarn-support may be manufactured by first forming the barrel 2 from a paper or fibrous sheet wound or wrapped around a mandrel and cementing the layers together with a suitable adhesive as they are being applied one over another. The flaring or conical flange 3 at the lower end of the tube 2 may be formed by shaping the mandrel to a corresponding contour or by expanding the end of the tube after it has been completed. Likewise, the reduced flange 7 at the opposite end of the tube may be formed by contracting the fiber or paper material around a reduced portion of the mandrel while the layers are being wound therearound or it may be shaped later under compression.

After the tube 2 has been completed with its ends shaped as described it may be placed in a mold having an opening conforming to its cylindrical periphery and a suitable annular cavity in its walls surrounding its end and shaped to the contour of the ferrule 5. The mold may also be provided with an insert or core in the form of a mandrel of a diameter conforming to that of the bore in the main portion of the tube and with a reduced portion at one end shaped to conform to the bore 8 of the thimble 6 to be produced. The mandrel may also be formed with a tapered shoulder between its larger and smaller portions for molding the taper at the inner end of the thimble. The axial mandrel or core-like insert extending through the mold thus will provide a support for the tube or barrel 2 to maintain it in concentric relation with the walls of the cavity in the mold; the arrangement being similar to that shown and described in the copending application referred to above. If preferred, the ferrule 5 and thimble 6 may be molded on the ends of the tube during separate operations but, preferably, the mold may be constituted to form both the ferrule and thimble at one operation in the manner as generally used for molding plastic material around cylindrical objects.

It is to be particularly noted that the plastic elements at opposite ends of the tube or barrel 2 are of such shape and contour as to completely surround the terminal portions of the tube whereof to securely embed them therein. Thus, the hardened plastic material encloses and protects the raw edges of the fibrous tube and the ferrule and thimble are securely bonded thereto to prevent them from turning thereon or being displaced axially thereof. When hardened, the plastic material is of dense structure but nevertheless somewhat resilient so that if the cop-tube is subjected to rough handling, dropped on a cement floor, or otherwise brought into contact with adjacent objects it will resist severe impact without chipping, splintering or denting. Consequently, the tube is protected at its ends to always provide a smooth exterior surface for the yarn, particularly at the end carrying the thimble 6 across which the yarn draws in delivering it from the wound bobbin. At the same time, the thimble at the end of the bobbin provides a smooth bore for receiving the end of the spindle on which the cop-tube is mounted with said bore disposed exactly concentric with the exterior of the tube so that the latter will not run out when rotated with or on the spindle of the machine in which it is used.

It will be observed from the foregoing specification that the present invention provides for producing cop-tubes or yarn-supports of improved construction, relatively light in weight, economical to manufacture, and possessing maximum resistance to splitting, chipping or marring to insure greater durability under hard use. The ends of the barrel of the cop-tube being constructed of thermosetting plastic or other vulcanizable material molded directly on and firmly bonded to the fibrous tube provide an extremely strong and permanent structure with a smooth finish on all exterior surfaces.

By molding the plastic material directly onto the fiber tube the present method of producing the improved article may be practiced without especial skill or expertness while resulting in greater accuracy in forming the ferrule and thimble concentrically of the tubular barrel. While the improvements are herein shown as applied to use to produce a cop-tube of the type commonly employed for supporting spinning bobbins, it is to be understood that the shape and dimensions of the tube may be varied as desired without departing from the spirit or scope of the invention. Therefore, without limiting ourselves in this respect, we claim:

1. A cop-tube or yarn-support for textile materials comprising a tubular fiber barrel contracted at one end to form a terminal portion of reduced diameter; and a plastic thimble molded around the end of the barrel surrounding the reduced terminal portion thereof and extending into its interior to provide a bore of smaller diameter than that of the interior of the barrel.

2. A core or support for bobbins and the like consisting in a tubular barrel having one end contracted to form a terminal portion of lesser diameter than the body of the tube, and a ferrule of thermosetting plastic material molded around the end of the barrel completely enclosing its reduced terminal portion with its outer periphery flush with that of the barrel and its interior of less diameter than the interior of the barrel.

3. A cop-tube or yarn-support of the type indicated comprising a tubular fiber barrel having an expanded flange at one end and a contracted flange at its opposite end, a plastic ferrule molded around one end of the barrel with the expanded terminal flange embedded therein and enclosed on all sides by said material, said ferrule having an interior wall flush with the interior of the tube, and a plastic thimble molded around the opposite end of the barrel surrounding the reduced terminal flange with the latter embedded therein and formed with a bore of less diameter than that of the interior of the tube.

4. A method of producing cop-tubes or yarn-supports consisting in forming a fiber tube with a contracted portion at one end, and molding a ferrule of plastic material around the end of the tube with the contracted terminal flange thereof completely embedded in and surrounded on all sides by said material to firmly bond the ferrule thereto with its inner wall lining the interior of the tube to provide a reduced bore at its end.

5. A method of manufacturing cop-tubes or yarn-supports comprising forming a tubular barrel by winding a sheet of fibrous material about a mandrel and cementing the superimposed layers together with an adhesive, contracting one end of the barrel to provide a terminal portion of reduced diameter, and molding plastic material around said end of the barrel to embed the terminal portion thereof in the material and enclose it on all sides.

HARALD L. AMRHEIN.
EMIL E. FULLER.